United States Patent [19]

Lubsen et al.

[11] E Re. 31,427

[45] Reissued Oct. 25, 1983

[54] AROMA-ENRICHED COFFEE PRODUCTS AND PROCESS

[75] Inventors: Timothy A. Lubsen, Springfield; Rudolf G. K. Strobel, Colerain; Richard N. Reinhart, Springfield; Jayantilal M. Patel, Reading, all of Ohio

[73] Assignee: The Procter & Gamble Company, Cincinnati, Ohio

[21] Appl. No.: 337,226

[22] Filed: Jan. 6, 1982

Related U.S. Patent Documents

Reissue of:

[64] Patent No.: 3,769,032
Issued: Oct. 30, 1973
Appl. No.: 189,746
Filed: Oct. 15, 1971

U.S. Applications:

[63] Continuation of Ser. No. 967,045, Dec. 6, 1978, abandoned, which is a continuation-in-part of Ser. No. 156,555, Jun. 24, 1971, abandoned.

[51] Int. Cl.[3] ..... A23F 5/46

[52] U.S. Cl. ..... 426/594; 426/385; 426/386; 426/388; 426/392; 426/281

[58] Field of Search ..... 426/594, 385, 386, 387, 426/388, 281, 392

[56] References Cited

U.S. PATENT DOCUMENTS

| | | | |
|---|---|---|---|
| 2,041,056 | 5/1953 | Fleisher | 426/281 X |
| 2,825,190 | 3/1958 | Heald | 427/212 X |
| 3,021,218 | 2/1962 | Clinton et al. | 426/384 |
| 3,035,922 | 5/1962 | Mook et al. | 426/387 |
| 3,406,074 | 10/1968 | Klein et al. | 426/478 |
| 3,704,132 | 11/1972 | Strobel | 426/594 |

*Primary Examiner*—Joseph M. Golian
*Attorney, Agent, or Firm*—Rose Ann Dabek; Michael J. Roth; Julius P. Filcik

[57] ABSTRACT

An aromatized instant coffee comprising the combination of aroma-enriched carrier and instant coffee. The product has an aroma intensity of at least 70,000 gas chromatograph counts, a pore factor of at least 0.9, and a retention factor of at least 0.80. Also part of the invention are preferred methods of applying aroma-enriched carrier to coffee products whose roast and ground coffee aroma is desired to be increased. An especially preferred method comprises adding aroma frost-enriched coffee oil in a dropwise addition manner to the coffee product. In a most preferred embodiment, dropwise addition is accomplished by injection, preferably by a syringe member, which is extended from the open end of a coffee container to near the bottom of the container and while the syringe is being pulled upward out of said container a predetermined amount of aroma-enriched coffee oil is injected into the product.

36 Claims, No Drawings

AROMA-ENRICHED COFFEE PRODUCTS AND PROCESS

Matter enclosed in heavy brackets [ ] appears in the original patent but forms no part of this reissue specification; matter printed in italics indicates the additions made by reissue.

CROSS REFERENCE TO A RELATED APPLICATION

[This application is a continuation-in-part of copending U.S. Pat. application Ser. No. 156,555, filed June 24, 1971, now abandoned.]

*This application is a continuation of Reissue Application Ser. No. 967,045, filed Dec. 6, 1978, now abandoned which is a reissue of Ser. No. 189,746, filed Oct. 15, 1971, now U.S.P. No. 3,769,032 which is a continuation-in-part of Ser. No. 156,555, filed June 24, 1971, now abandoned.*

BACKGROUND OF THE INVENTION

The prior art is replete with references relating to low temperature condensation of coffee aroma frost. Aroma frost is a low temperature condensate of volatiles which escape during coffee processing, for example during roasting, grinding, steam distillation, extracting where it is employed, and dry distillation. These volatile constituents are often obtained by low temperature condensation of the escaping gaseous material, for example, at liquid nitrogen temperatures, by passing the escaping gas through a liquid nitrogen trap to yield a condensate which is referred to herein as an aroma frost. The aroma frost may be grinder gas frost, roaster gas frost, a dry distillation frost, a steam distillation frost, and the like. For examples of patents relating to methods of providing aroma frost, see for example, Lemonnier, U.S. Pat. No. 2,680,687, issued June 8, 1954; U.S. Pat. No. 3,021,218, Clinton et al., issued Feb. 13, 1962; Kline, U.S. Pat. No. 3,406,074; Mook et al., U.S. Pat. No. 3,035,922, issued May 22, 1962; and Kline et al., U.S. Pat. No. 3,535,118, issued Oct. 20, 1970.

However, once obtained, to be of value aroma frost must then be incorporated in a relatively stable manner into the coffee product whose roast and ground coffee aroma is desired to be increased. Usually this coffee product comprises an instant coffee because instant coffees are notably deficient in characteristic roast and ground coffee aroma. It has been found that little or no aroma value is obtained by using conventional coffee oil addition techniques in adding aroma frost to instant coffee products because nearly all of the aroma escapes before transfer to the jar. However, some aroma is retained providing the instant coffee has previously been sprayed or come in contact with in some other manner, coffee oil. For some reason, not precisely known, the coffee oil acts as a stabilizing factor in allowing a certain degree of retention of aroma frost aroma within the aromatized coffee product.

Still, even where aroma frost is first mixed with coffee oil and allowed to equilibrate in a manner such as is disclosed in co-pending application of Strobel entitled "Separating Aroma- and Flavor-Bearing Substrates Into Aroma and Flavor Concentrates," and then sprayed upon a coffee product, or where the aroma frost is incorporated into a highly stable purified coffee oil as is shown by copending U.S. Pat. application of Strobel, Ser. No. 126,305, filed Mar. 19, 1971 now U.S. Pat. No. 3,704,132, and thereafter sprayed upon instant coffee, it has been found that after spray-on addition the aroma intensity is significantly decreased.

Therefore, while condensation of aroma frost has heretofore been known, and while the value of utilizing coffee oil in combination with aroma frost has heretofore been known, it has not been heretofore appreciated that the manner of addition of the aroma-enriched coffee oil, or other suitable aroma carriers, to a coffee product whose aroma is desired to be increased is critical. It has now been found that where conventional methods of addition such as spraying, which is characteristically used in applying coffee oil to coffe products, are employed, the highly volatile constituents are stripped from the coffee oil and escape during the addition procedure. Consequently little benefit is obtained by utilizing the aroma-enriched oil as a coffee product aroma enhancer.

To summarize briefly, obtaining high quality aroma-enriched coffee oil or other carrier is only part of the story. The aroma transferred into the carrier is an extremely volatile material and if it is not carefully handled the previously entrapped volatiles can easily escape. Therefore, it often happens that by the time the aroma-enriched carrier is added to a coffee product whose aroma is desired to be increased, any benefit which might have been obtained is no longer present because highly aromatic volatile constituents have escaped.

Besides the importance of how aroma-enriched carriers, such as coffee oil, are added to a product whose aroma is desired to be increased, another factor has been found to be of particular importance where the coffee whose aroma is to be enhanced is an instant coffee. This second important factor is the coffee surface characteristics. If the instant coffee surface structure is such that the coffee has too many surface voids, the ability to retain added aroma upon aging in a sealed jar, without intensity loss or aroma character change, no matter what method of addition is employed, seems beyond reach.

Accordingly, it is an object of this invention to provide a method of addition of aroma-enriched carrier to coffee products whose roast and ground coffee aroma is desired to be increased, which does not strip away or otherwise allow escape of the highly volatile but high aroma-bearing constituents.

Still another object of this invention is to provide a commercially feasible method of adding aroma-enriched carrier to coffee products whose roast and ground coffee aroma is desired to be increased.

Yet another object of this invention is to provide aroma-enhanced instant coffee products which will retain the added aroma without intensity loss of character change, because of a suitable surface structure.

The method of accomplishing these and other objects will be apparent from the following detailed description of the invention.

DETAILED DESCRIPTION OF THE INVENTION

As used herein the term "aroma carrier" is to be distinguished from "aroma-enriched carrier." "Aroma carrier" is intended to mean any suitable sorbent to which roast and ground coffee aroma can be transferred by means of acting as a carrier for condensed aromatic volatiles. The term "aroma carrier" as defined herein is intended to include but not be limited to materials such as coffee oil, liquid glycerides, concentrated coffee extract, propylene glycol, glycerine, and water. Of course the most important aroma carrier from a practical standpoint presently is coffee oil. "Coffee oil" as used herein means the natural product obtained by solvent extraction of coffee beans or expelling from coffee beans as described in Sivetz, Coffee Processing Technology, Vol. 2, pages 21-30, Avi Publishing Company (1963), which is incorporated herein by reference.

On the other hand, "aroma-enriched carrier" and specifically "aroma-enriched coffee oil" generally refers to coffee oil which has been aromatized by adding thereto condensed volatile aroma constituents. For purposes of convenience and clarity the following description, unless stated to the contrary, is given for use of coffee oil as the aroma carrier; however, it is to be understood, and will be evident from the examples, that the other aroma carriers heretofore mentioned can also be used.

Aroma-enriched coffee oil is generally prepared by mixing coffee oil and aroma frost together, allowing them to equilibrate for a certain period of time, after which the mixture is allowed to liquefy. This liquid mixture as previously stated will be referred to herein as aroma-enriched coffee oil.

The aroma frost which is mixed with coffee oil to provide aroma-enriched coffee oil can be, as heretofore briefly explained, a roaster gas frost, grinder gas frost, a dry distillation frost, a steam distillation frost, a flaking gas frost, and the like. In each instance the gaseous materials escaping from the particular operation being conducted are swept away and passed into a condenser held at extremely low temperatures, usually liquid nitrogen temperatures, i.e., −195.8° C. At such extremely low temperatures the gas condenses as a frost within the liquid nitrogen trap. In providing aroma-enriched coffee oil, the next step comprises adding coffee oil to the aroma frost. If desired, the coffee oil can be added to the frost as a liquid or it can be frozen in liquid nitrogen and added to the aroma frost. Where the coffee oil is added as a liquid, because of the extremely low temperatures employed in the trap, the coffee oil immediately freezes along with the aroma frost to provide a solid aroma frost coffee oil matrix. Typically, thereafter the aroma frost coffee oil matrix is allowed to equilibrate at ambient conditions to provide a coffee oil having an extremely intense roast and ground coffee aroma. In fact, the intensity of the roast and ground coffee aroma of aroma-enriched coffee oil prepared in the manner described herein is much greater, as will be explained hereinafter, than the aroma intensity of roast and ground coffee itself. It is this product, i.e., aromatic-enriched coffee oil regardless of the formation technique employed, that is added back to coffee products whose roast and ground coffee aroma is desired to be increased by utilizing the process of this invention.

Before describing in detail the proper surface characteristics of the coffee product to be aromatized, attention will be directed to the manner of addition of the aroma-enriched carrier to the coffee product.

In accord with the process of this invention aroma-enriched coffee oil is added to coffee products whose roast and ground coffee aroma is desired to be increased in a manner which avoids exposing a larger surface area of the aroma-enriched carrier to air or other gases. It has been found critical to the process of this invention that only manners of addition which do not expose the aroma-enriched carrier, or at least larger portions of it, to surface contact with air or other gases during transfer to the product whose aroma is to be enhanced, be employed. In the event that any manner of addition (such as conventionally practiced spraying) which significantly increases the surface exposure to air or other gases is employed, rapid volatilization or dilution or diffusion of the unstable and highly volatile aroma constituents will occur, leaving behind aroma carrier which is not substantially improved in aroma quality from what it was prior to the aroma enrichment process. In particular, as will be evidenced from the experimental runs shown in the examples, conventional spray-on techniques are of no value because of the high aroma loss. Likewise, drum application methods where aroma-enriched coffee oil or other carrier is added to a tumbling drum of coffee product whose roast and ground coffee aroma is desired to be increased, and tumbling continues for a predetermined amount of time, have been found to be of no value because of high aroma losses.

As can be seen, the critical factor is that no method which significantly increases the amount of exposure to and/or surface contact with air or other gases causing volatilization, dilution and diffusion of the aroma-enriched carrier will be satisfactory. Examples of some suitable methods of addition which do not involve increased surface exposure or contact with air or other gases include dropwise addition, which as explained hereinafter is preferred, continuous flow methods of addition, addition of frozen chunks of aroma-enriched carrier directly to product, and contact spraying techniques as long as there is intimate contact between aroma-enriched carrier spraying device and product during addition.

As mentioned above, dropwise addition is preferred because it is efficient, does not involve much surface exposure to air or other gases, and is very practical.

The term "dropwise addition" is intended to encompass methods of adding discrete droplets of material as opposed to methods such as conventionally practiced spraying which involves atomization and considerable gas exposure. As a general guide, typical pneumatic nozzle devices used for coffee oil spray-on give atomized particles of less than 0.5 mm diameter; whereas the dropwise addition of this invention generally provides discrete droplets of a diameter of from about 0.5 mm to about 5.0 mm and preferably from about 1 mm to about 3.0 mm.

The dropwise addition can be accomplished in many ways. For example, the simplest method merely comprises pipetting in a dropwise manner the aroma-enriched coffee oil onto the coffee product. Of course this is not practical where large amounts of coffee product are to be aroma-enriched prior to sale. However, another aspect of this invention comprises the development of a unique and commercially feasible dropwise addition method.

In this preferred and highly practical embodiment, dropwise addition of aroma-enriched coffee oil to coffee products whose roast and ground coffee aroma is desired to be increased is accomplished by dropwise injecting aroma-enriched coffee oil into the coffee product while said product is in a packing container. In particular, injection is accomplished by utilization of a mechanically powered syringe member. As used herein, the term syringe member is intended to mean a hollow needle which is connected to a reservoir of aroma-enriched coffee oil and which is capable of emitting in dropwise fashion aroma-enriched coffee oil. The syringe member is mounted in such a manner that it can be subjected by suitable mechanical means to a reciprocating motion which will allow the syringe member to move up and down.

In accord with this preferred embodiment, containers of coffee product whose roast and ground coffee aroma is desired to be increased are guided underneath the syringe member or a plurality of such members. At this point in time the container has an opn end exposing the coffee product. The syringe member is injected into the container such that it extends to near the bottom of the container and, while the syringe member is being pulled upward out of the container, a predetermined amount of aroma-enriched coffee oil is injected into the product. Preferably the entire amount of aroma-enriched coffee oil to be injected is injected into the bottom one-half to nine-tenths portion of the coffee product, most preferably in the bottom two-thirds to three-fourths portion of the coffee product. In this manner a top layer of coffee product covers the aroma-enriched portion and acts as a further means of reducing aroma escapement from the jar prior to sealing.

Further, it should be noted in accord with this preferred method of practicing the process of this invention the entire dropwise injection occurs while the syringe member is being pulled upward out of the coffee product container. This has been found to be important from the standpoint of practicing the highly preferred embodiment wherein the aroma-enriched coffee oil is injected into the bottom portions of the coffee product. Where injection occurs while the syringe member is moving in a downward fashion, there is a greater tendency for coffee oil drops to agglomerate and as a result form some unsightly chunks of highly wetted product. A further disadvantage is that where dropwise injection occurs while the syringe member is moving in a downward fashion, the syringe member becomes coated with oil and coffee particles tend to adhere to it, causing surface disruption in the packing jar when removing the syringe member.

No criticality exists with regard to the amount of aroma-enriched coffee oil which is added in dropwise fashion to any particular coffee product. Any suitable level commonly used in regard to the addition of coffee oil can be employed. Typically, the amount of the aroma-enriched coffee oil can range from 0.1 to 0.8 percent by weight of the coffee product, and preferably from 0.1 to 0.4 percent by weight of the coffee product.

In order to insure the maximum aroma intensity of the coffee product which has been aromatized by dropwise addition of aroma-enriched coffee oil, it is preferred that the open end of the container be sealed as rapidly as possible, typically within from one second to two minutes, and always within from one second to several minutes after dropwise addition.

While the above description has been given in detail with regard to the preferred dropwise method of addition, previous mention has been made of the fact that other methods of addition which do not involve significant contact between air or other gases and the aroma-enriched carrier can be employed. For example, the aroma-enriched carrier can be caused to flow in a continuous stream from a dispensing device such as the previously described syringe member directly onto the product. While this method produces a satisfactory product from the standpoint of aroma quality, it may have the disadvantage of forming unsightly agglomerates at the dispensing site.

Another satisfactory manner of addition is to form frozen chunks of aroma-enriched carrier and add these frozen chunks directly to product. This method, like the continuous flow method, will produce a satisfactory product from the aroma standpoint but also has the disadvantage of possibly forming localized agglomerates when the frozen chunk melts.

Yet another method of addition which can be employed is contact spraying, spraying coupled with intimate contact between the spray device and the product whose aroma is to be enhanced. As previously mentioned, conventionally practiced atomizing techniques such those used to apply coffee oil to instant coffee are unacceptable. In this type of conventional atomizing technique there is a large air space between the atomizer and the product, and when this condition exists while practicing the process of this invention the aroma incorporated in the aroma-enriched carrier is stripped away and lost by a combination of volatilization, dilution and diffusion, leaving behind only non-aromatized carrier. However, where there is intimate contact between product to be aromatized and the spray device, no losses as described above are noticed. "Intimate contact" as used herein means that the distance between spray device and product is reduced to the smallest possible gap, i.e., best is no gap, and preferably does not exceed one-half inch, and most preferably does not exceed one-fourth inch.

The phrase "coffee products whose roast and ground coffee aroma is desired to be increased" is intended to encompass both instant coffee products and roast and ground coffee itself. For, as will be evident from the explanation to follow, the process of this invention allows increasing aroma intensity of even roast and ground coffee far beyond that which is normally present. In particular, the coffee product to be aroma enriched can be caffeine-containing or decaffeinated, a conventional spray-dried instant coffee, an agglomerated spray-dried instant coffee, a freeze-dried instant coffee, an agglomerated freeze-dried instant coffee, coffee flakes, and roast and ground coffee in all of its various forms. In addition, mixtures of spray-dried and freeze-dired instant coffees either agglomerated or unagglomerated can also be employed as well as mixtures of roast and ground and instant coffees. As explained hereinafter, some of these coffees may have to be treated prior to use to make them structurally compatible with the aroma-enriched carrier.

Another important aspect of this invention involves the discovery that not all coffee particles are structurally compatible with the aroma-enriched carrier. As used herein the phase structurally compatible means coffee particles which have the ability of originally accepting the aroma-enriched carrier and more importantly, the ability to retain the aroma so that upon extended aging in sealed jars the product still retains a significantly increased roast and ground coffee aroma which has not been diminished in intensity or changed in aroma character upon aging.

To briefly generalize, it has been found that coffee particles having highly porous structures are not compatible with the aroma-enriched carrier. While not wishing to be bound by any theory, it is believed that highly porous particles are unsatisfactory because they have so many active sites for sorption which results in the particle acting very much like a sponge when the aroma-enriched carrier is added. Additionally, there appears to be some sort of particle interaction possibly between the sorbed aroma-enriched carrier and other sorbed particle substances such as oxygen which significantly degrades the aroma character. Thus, as can be seen, such porous particles sorb the aroma-enriched carrier which not only prevents aroma release during product jar openings but also changes the character of the aroma that is released.

Products which are structurally compatible with the aroma-enriched character can broadly be described as those of a relatively non-porous structure. When non-porous products are combined with the aroma-enriched carrier, the aroma-enriched carrier is deposited on the product surface and a minimum of sorption occurs. Thus an equilibrium is established between the liquid phase, i.e., the aroma-enriched carrier and the volatilized aroma compounds within the available container space. When the product container is opened the volatilized aroma escapes and is sensed by the olfactory nerves to provide an intense coffee aroma; on the other hand, when the container is closed because the equilibrium between the liquid phase aroma-enriched carrier and its vapor has been shifted, more aroma volatilizes from its freely available position on the structurally compatible product to again fill the vessel with volatilized aroma. Importantly, because of this structural compatibility the aroma is freely available for sensing upon successive container openings, i.e., is retained, and does not change in character because of contaminating materials which have been sorbed and act to degrade the aroma character.

Examples of structurally non-compatible products which are therefore unsuitable for use herein unless treated to make them less porous include most freeze-dried coffees, and most spray-dried non-agglomerated instant coffees.

Examples of suitable structurally compatible products for use in this invention include flaked instant coffees, agglomerated or steam-treated instant coffees, low concentration 15–30 percent solubles extracts which have been slowly frozen and freeze dried, and freeze-dried products prepared by increasing pressure during freeze drying to cause controlled partial meltback during drying to give a relatively non-porous structurally compatible product.

Structural compatibility as defined herein can be conveniently measured by a method called mercury porosimetry. For precise details of this method see an article by Frevel et al., "Modifications in Mercury Porosimetry," Analytical Chemistry Vol. 35, No. 10, Sept. 1963, pp. 1,492–1,502, which is incorporated by reference herein. Briefly, the method comprises forcing mercury under pressure by means of a penetrometer into the voids of the particle surface and knowing the initial weight of the particles and the amount of mercury weight added by filling voids a specific density number referred to herein as pore factor can be determined. More specifically, the Mercury Porosimetry technique measures specific density variations with changes in pressure. Basically the technique involves forcing mercury into a glass bulb of known volume and containing a known weight of particles by varying the pressure of the system. As the pressure increases, the mercury fills the void spaces in between particles. Once these void spaces are filled, increases in pressure will force mercury into any particle surface pores present. Further increases in pressure will cause the mercury to penetrate the smaller, more inaccessible pores which open onto the particle surface. When all pores have been penetrated, further increases in pressure will not force any more mercury into the bulb and specific density will remain constant. For non-porous substances, once the void spaces between particles are filled, further increases in pressure will result in a constant specific density.

Applying the above described technique to the specifics of the present invention is accomplished by first evacuating the penetrometer containing the desired particles to a pressure of less than 0.5 millimeters of mercury, placing the mercury contained in a surrounding evacuated vessel into contact with the penetrometer, and thereafter gradually increasing the pressure and taking incremental readings from the calibrated penetrometer which are then plotted against pressure. The pore factor, explained below, is the reading obtained from the plotted curve at an absolute pressure of 550 millimeters of mercury pressure.

Products which have a pore factor of 0.9 or greater have been found structurally compatible for use in this invention. On the other hand, products having a pore factor of less than 0.9 are structurally incompatible because of their highly porous nature, giving rise to an undesirable propensity for sorption which causes a significant aroma intensity decrease and aroma character degradation.

Product which is structurally compatible with the aroma-enriched carrier and has a pore factor of at least 0.9 also has an excellent ability of retaining the desirable aroma without aroma character degradation, i.e., changing to a noncoffee-like aroma. Specifically, the product will have an aroma retention factor of not less than 0.80. The retention factor as defined herein is the percent of initial aroma intensity retained after 2 months aging in a sealed jar expressed as a decimal. As explained later, this is measured in terms of gas chromatograph counts (ordinate) vs. the aging time in a sealed jar (abscissa). Product comprising the combination of structurally compatible coffees and aroma-enriched carrier has a retention factor of 0.80 or greater, which means that after 2 months of aging in a sealed jar the product aroma intensity is at least 80 percent of what the initial intensity was and its character remains essentially unchanged.

As previously discussed on numerous occasions, the coffee product which has been prepared in accord with the process of this invention is distinctly different from all other coffee products in regard to characteristic aroma constituents. A convenient method for measuring aroma intensity of coffee products is by gas chromatographic analysis.

In accord with gas chromatograph aroma measurement analysis, the following standard procedure is employed. A sealed, 2-ounce size jar of the coffee product to be tested is obtained. A syringe is inserted through the seal and a 10 cubic centimeter sample of the gaseous constituents in the jar headspace is withdrawn. The 10 cc gaseous sample is then placed into a conventional gas chromatograph wherein the sample is separated into its various aroma components or groups of components. The components are separated and indicated on a graph showing various aromatic component peaks. The more aromatic constituents the more peaks are present on the graph; in addition, the greater the total area under the peaks the more intense the product aroma. Since the number of peaks as well as their height are an indication of aroma intensity, determining the area under the peaks by well known integration methods provides an accurate measurement of aroma intensity. This integrated figure is referred to herein as "counts." This is conveniently obtained by utilization of an electronic integrator.

Utilizing the above technique, very definite standard aroma intensities for roast and ground coffee and instant coffee products can be determined. These results are indicated in the following Table. The products used as standards herein represent leading commercially available coffee products having from 0.3 to 0.5 percent by weight of coffee oil sprayed thereon, except for the product showing no use of coffee oil which is presented to show the effect of conventional prepared coffee oil per se on aroma intensity. The results show the range for several samples of each type of coffee product. Freeze-dried 1 and 2 refer to the two current market leaders in this class of coffees.

TABLE I

| *Standard | Counts** | Pore Factor |
|---|---|---|
| Agglomerated spray-dried | 19,000 | 1.39 |
| Agglomerated flaked instant | 23,000 | 1.39 |
| Freeze-dried No. 1 | 14,000 | 0.59 |
| Freeze-dried No. 2 | 19,000 | 0.58 |
| Spray-dried with no coffee oil | | 0.73 |
| Spray-dried with coffee oil | 10,000 | 0.73 |
| Roast and ground | 165,000-210,000 | |

*Tests conducted on a 2-ounce jar of product.
**Average of several runs.

As can be seen from examination of Table I, the greatest aroma instant coffee product commercially produced in an agglomerated flaked instant coffee product which has an average number of counts of 23,000 in a 2-ounce jar. However, even this is considerably less than the average of sample of roast and ground coffee which has between 165,000 and 210,000 counts.

It should be understood that the gas chromatograph measured counts given in Table I are with specific reference to 2-ounce jars and do not represent maximum obtainable counts irrespective of jar size. For example, some marketed instant coffees in 8- and 10-ounce jars may have initial count measurements as high as 55,000 counts. However, as explained below no presently known product reaches the lower limit of aromatized product of this invention, i.e., 70,000 counts.

According to the process of this invention, in most instances the aromatized product has a gas chromatograph measured aroma at least equal to that of roast and ground coffee. In every instance the aroma is significantly greater than the aroma intensity for those conventional instant coffee products listed in the table above. Speaking with regard to instant coffee, the gas chromatograph measured aroma intensity is at least 70,000 counts, preferably within the range of from 70,000 counts to 1,000,000 counts. Most preferably, the coffee product, where it is an instant coffee, has an aroma intensity of from 165,000 to 650,000 counts. Within this most preferred range, an instant coffee product will have an initial aroma intensity at least equal to and in most instances greater than roast and ground coffee itself.

With regard to roast and ground coffee, as indicated in Table I, conventional roast and ground coffee has a gas chromatograph measured aroma intensity of greater than 165,000 counts, and typically within the range of from 165,000 to 210,000. In every instance roast and ground coffee which has been aromatized in accord with this invention has a gas chromatograph measured aroma of greater than 165,000 counts and most often greater than 210,000 counts. A practical upper limit for the roast and ground coffee gas chromatograph measured initial aroma is 1,000,000 counts.

The following Examples are offered to further illustrate the process of this invention.

EXAMPLE 1

An agglomerated spray-dried coffee as shown in Table I (pore factor 1.39) was placed in a 2-ounce jar to the half-full level. A standard laboratory pipette capable of emitting dropwise portions of liquid was filled with aroma-enriched coffee oil, prepared as described below. Thereafter the aroma-enriched coffee oil was dropped onto the agglomerated spray-dried coffee whose roast and ground coffee aroma was desired to be increased in a dropwise addition manner by the utilization of the pipette. The discrete droplet diameter was 2.0 millimeters. The aroma-enriched coffee oil was pipetted, i.e., dropped, over the exposed surface area of the half-full jar. Thereafter the remaining portion of agglomerated spray-dried coffee necessary to fill the 2-ounce jar was added and the jar was capped and sealed.

Capping and sealing occurred within approximately 30 seconds after filling of the jar.

Gas chromatograph aroma measurement analysis following the standard procedure previously described in the specification was conducted on the product and the results are shown in the following Table.

TABLE II

| Amount of Aroma-Enriched Coffee Oil on Product | Gas Chromatograph Counts |
|---|---|
| 0.1% | 129,000 |
| 0.2% | 273,000 |
| 0.3% | 395,000 |
| 0.4% | 495,000 |
| 0.5% | 550,000 |
| 0.6% | 640,000 |

As can be seen from an examination of the results shown in Table II, the product even at a 0.1 percent by weight level of aroma-enriched coffee oil had a gas chromatograph measured aroma of 129,000 counts, as compared to an average of 19,000 counts as shown in Table I where conventional coffee oil was utilized.

The aroma-enriched coffee oil utilized in this and the following Examples, as well as the other aroma-enriched carriers used in some of the subsequent Examples, was prepared in the following manner. Coffee aroma which normally escapes from roast and ground coffee, i.e., grinder gas, was swept away and condensed in a trap held at liquid nitrogen temperatures. Thereafter conventionally process coffee oil was dropped into liquid nitrogen to freeze and sub-divide the coffee oil. The frozen and subdivided coffee oil was placed into contact with the previously condensed aroma frost and allowed to equilibrate to provide a liquid mixture of aroma-enriched coffee oil.

EXAMPLE 2

A 2-ounce jar of each of the coffee products shown in Table III below was prepared. Thereafter aroma-enriched coffee oil was injected into the jar in a dropwise addition fashion by utilizing a conventional medical hypodermic needle (syringe). After the desired weight of coffee oil, specified in Table III below, was injected in dropwise fashion, the jar was sealed and capped. The discrete droplet size was estimated to be between 1.0 mm and 3.0 mm.

TABLE III

| Amount of aroma-enriched oil | Product description | Pore factor (PF) | Retention factor | Initial gas chromatograph measured counts |
|---|---|---|---|---|
| .2% | Agglomerated spray-dried. | 0.94 | 1.00 | 276,000 |
| .2% | Freeze-dried chunks and spray-dried agglomerated. | .94 | 1.00 | 232,000 |
| .2% | Freeze-dried chunks | .62 | 0.76 | 194,000 |
| .2% | Roast & ground coffee | | | *215,000 |

*The non-aromatized product gave 165,000 counts.

EXAMPLE 3

In this Example dropwise injection of aroma-enriched coffee oil into the products listed in Table IV below was accomplished by injecting aroma-enriched coffee oil into the coffee product while the product was in a packing container. The apparatus utilized was a mechanically powered syringe member. The syringe member was mounted in such a manner that it could be subjected by mechanical power means to a reciprocating motion which would allow the syringe to move up and down. One, 2, and 8-ounce jars of the product specified in Table IV below were guided underneath the syringe member and the syringe was injected into the container through an open end to near the bottom of the container, and while the syringe member was being pulled upward out of the container predetermined amounts of aroma-enriched coffee oil, the amounts are specified in Table IV below, were injected into the product. In each instance the entire amount of aroma-enriched coffee oil was injected in a dropwise manner into the bottom two-thirds portion of the product. The aroma-enriched coffee oil was fed into the mechanically powered syringe member through a reservoir which was capable of emitting in dropwise fashion the aroma-enriched oil. The jars were immediately sealed and capped within 15 seconds after filling. The discrete droplet size was estimated to be between 1.0 mm and 3.0 mm.

TABLE IV

| Amount of Aroma-enriched Oil on the Product | Jar Size | Product Description | Gas Chromatograph Counts |
|---|---|---|---|
| 0.7% | 1 ounce | *Agglomerated flaked instant | 630,000 |
| 0.36% | 2 ounce | *Agglomerated flaked instant | 390,000 |
| 0.29% | 8 ounce | *Agglomerated flaked instant | 300,000 |

*Pore factor is 1.39

EXAMPLE 4

The procedure of Example 1 was duplicated utilizing the aroma-enriched coffee oil of Example 1 in order to compare the conventional pneumatic nozzle atomization technique with the dropwise addition method shown in Example 1. The aroma-enriched oil when atomized and sprayed on the product of Example 1 at a level of 0.53 percent by weight addition to a 10-ounce jar using an estimated distance of 2 inches between the coffee and spray nozzle, which was sufficient to allow a high proportion of the aroma-enriched oil to be exposed to $CO_2$ atmosphere, provided a total gas chromatograph count of 2,099 after being fed by a vacuum flow filler into jars and packed. Where the drip-on method of Example 1 was utilized with a 10-ounce jar of the coffee of Example 1, at a weight percent level of 0.5 percent, the total gas chromatograph count was 91,182.

As can be seen by the results of this Example, conventional spraying of aroma-enriched coffee oil onto a coffee product (and its subsequent packing) whose roast and ground coffee aroma is desired to be increased is not effective because the atomization which occurs during spraying, where intimate contact is not also employed, strips the most valuable aroma volatiles. On the other hand, the dropwise addition technique provides a substantial improvement in aroma intensity.

EXAMPLE 5

An agglomerated spray-dried coffee whose porosity factor, determined by the previously described mercury penetration technique, is 0.94, is aromatized exactly as described in Example 3 using 0.3 percent of aroma-enriched coffee oil. The product had an original gas chromatograph measured aroma intensity of between 230,000 and 240,000 counts. Expert panelists judged the aroma character to be the same as in ground coffee. At the end of three months, the intensity was maintained and the aroma was judged to be like vacuum coffee with some sweet character. At the end of 8 months, the aroma intensity was essentially unchanged (240,000 counts), and the aroma was still judged to be like vacuum coffee but with some sweet, caramel character too. The retention factor for this coffee was determined to be 1.00.

On the other hand, the same amount of the same enriched aromatizing oil was applied to a freeze-dried coffee which had a pore factor number of 0.62. The initial aroma intensity was measured by gas chromatography at 194,000 counts, and the initial aroma character was judged by the expert panel to be like ground roast coffee. At the end of 3 months the intensity had dropped to 118,000 counts and the aroma character was described as flat and peanutty rather than like vacuum coffee. At the end of eight months the gas chromatograph measured intensity was 98,000 counts and the aroma character was predominantly that of stale coffee. The retention factor for this freeze-dried coffee was 0.76.

This test shows that under identical conditions even including adding the same aroma-enriched oil, a structurally non-compatible coffee, i.e., pore factor of less than 0.9 and retention factor of less than 0.80, will not provide a satisfactory product.

EXAMPLE 6-10

An aroma-enriched carrier was added in the dropwise addition manner described in Example 3 to an agglomerated flaked instant coffee having a pore factor of 1.39. The aroma carrier was varied as described in the Table below. The results in terms of gas chromatograph measured intensity and retention factor are given in the Table.

TABLE V

| Carrier | Gas Chromatograph Measured Intensity | Level Added |
|---|---|---|
| Coffee oil | 195,000 | 0.3% |
| Coffee extract | 98,000 | 0.3% |

TABLE V-continued

| Carrier | Gas Chromatograph Measured Intensity | Level Added |
|---|---|---|
| (25% solubles) | | |
| Propylene glycol | 353,000 | 0.3% |
| Glycerine | 634,000 | 0.3% |
| Triglyceride vegetable oil | 400,000 | 0.3% |
| Water | 112,000 | 0.3% |

Examples 6–10 presented in the above Table show that aroma carriers other than coffee oil and specifically coffee extract, propylene glycol, glycerine, triglyceride vegetable oils, and water, all in combination with a structurally compatible coffee will provide a good product of excellent roast and ground coffee aroma intensity and character as well as having the ability to retain that aroma for considerable periods of time.

EXAMPLE 11

The procedure of Example 3 is repeated utilizing coffee oil as the aroma-enriched carrier which was added in the described dropwise addition manner at levels of 0.3 percent by weight and 0.6 percent by weight to the agglomerated flaked instant coffee of Example 3 which had a pore factor of 1.39. The aromatized product after packing into sealed 2-ounch jars had initially measured gas chromatograph intensities of 318,000 and 463,000, respectively.

Thereafter the same apparatus was employed and the aroma-enriched oil was added directly to a jar of the previously described instant coffee at a level of 0.53 percent by adding in a continuous flow manner. The product had an initial gas chromatograph measured intensity of 293,000.

The aroma enrichment process was again repeated using 0.75 percent by weight of aroma-enriched coffee oil as the carrier. In this instance chunks of aroma-enriched coffee oil which had been frozen in liquid nitrogen were added directly to jars of instant coffee to provide a product of initial gas chromatograph measured intensity of 439,000.

The process was again repeated using 0.62 percent by weight of coffee oil which was added by inserting a spray nozzle into the instant coffee-containing jar and atomizing the coffee oil with intimate contact between the oil and the product. The initial aroma intensity was 304,000.

We claim:

1. An aromatized instant coffee product having an intense roast and ground coffee aroma, said product comprising the combination of a structurally compatible instant coffee having a pore factor of at least [0.9] *0.94* and an aroma-enriched carrier, said product having an initial aroma intensity of at least [70,000] *165,000* gas chromatograph counts, *and an aroma retention factor of 1.0.*

2. The product of claim 1 wherein the aroma intensity is within the range of [70,000] *165,000* to 650,000 counts.

3. The product of claim 2 wherein the aroma-enriched carrier is coffee oil.

4. The product of claim 3 wherein the combination product of a structurally compatible instant coffee and aroma carrier comprises from 0.1 to 0.8 percent by weight of coffee oil.

5. The product of claim 4 comprising from 0.1 to 0.4 percent by weight of coffee oil.

[6. The product of claim 4 wherein the product has an aroma retention factor of 0.80 or greater.]

7. An aromatized instant coffee product having an intense roast and ground coffee aroma which does not rapidly degrade or change in character upon exposure to air, said product comprising the combination of an instant coffee having a pore factor of at least [0.9] *0.94* and an aroma-enriched carrier, said product having an initial aroma intensity of at least [70,000] *165,000* gas chromatograph counts and an aroma retention factor of [0.80 or greater] *1.0.*

8. The product of claim 7 wherein the aroma intensity is within the range of [70,000] *165,000* to 650,000 counts.

9. The product of claim 8 wherein the aroma-enriched carrier is a triglyceride vegetable oil.

10. The product of claim 8 wherein the aroma-enriched carrier is propylene glycol.

11. The product of claim 8 wherein the aroma-enriched carrier is glycerine.

12. The product of claim 8 wherein the aroma-enriched carrier is coffee oil.

13. The product of claim 12 wherein the aroma-enriched coffee oil comprises from 0.1 to 0.8 percent by weight of the product.

14. The product of claim 13 wherein the coffee oil comprises from 0.1 to 0.4 percent by weight of said product.

15. A method of making an aroma-enriched *instant* coffee product, said method comprising adding to a structurally compatible coffee product having a pore factor of at least [0.9] *0.94*, an aroma-enriched carrier, to provide a product having an initial aroma intensity of at least [70,000] *165,000* gas chromatograph counts *and an aroma retention factor of 1.0*, said addition being in a manner which avoids significant increase in the aroma-enriched carrier surface exposure and contact with air or other gases.

16. The process of claim 15 wherein the method of addition is dropwise addition.

17. The method of claim 15 wherein the method of addition is continuous flow.

18. The process of claim 17 wherein continuous flow addition is accomplished by inserting a syringe member into the open end of a packing container, said syringe extending from the open end of said container to near the bottom of said container, and while said syringe is being pulled upward out of said container, injecting in a continuous flow manner a predetermined amount of aroma-enriched coffee oil into said coffee product.

19. The method of claim 15 wherein the method of addition is adding frozen aroma-enriched carrier to said coffee product.

20. The method of claim 15 wherein the method of addition is spraying while said product is in intimate contact with the spray device.

21. A method of applying aroma-enriched coffee oil to coffee products whose roast and ground coffee aroma is desired to be increased, said method comprising, adding in a dropwise addition manner, aroma-enriched coffee oil to the product to provide a product having initial aroma intensity of at least [70,000] *165,000* gas chromatograph counts.

22. The process of claim 21 wherein the aroma-enriched coffee oil is added to said coffee product after placing said product in a packing container.

23. The process of claim 22 wherein the aroma-enriched oil is added by dropwise injection into the product.

24. The process of claim 23 wherein dropwise injection is accomplished by inserting a syringe member into the open end of a packing container, said syringe extending from the open end of said container to near the bottom of said container, and while said syringe is being pulled upward out of said container, injecting a predetermined amount of aroma-enriched coffee oil into said coffee product.

25. The process of claim 24 wherein the aroma-enriched coffee oil is injected into the bottom two-thirds portion of said coffee product.

26. The process of claim 24 wherein sealing of said container is accomplished within from one second to 2 minutes after injection.

27. The process of claim 24 wherein the amount of aroma-enriched coffee oil injected is from 0.1 to 0.8 percent by weight of said coffee product.

28. The process of claim 27 wherein the amount of coffee oil is from 0.1 to 0.4 percent by weight of said product.

29. The process of claim 24 wherein the coffee product is spray-dried instant coffee.

30. The process of claim 29 wherein said instant coffee is agglomerated as well as spray dried.

31. The process of claim 24 wherein said coffee product is freeze-dried instant coffee.

32. The process of claim 31 wherein said coffee product is agglomerated freeze-dried instant coffee.

33. The process of claim 24 wherein said coffee product is a mixture of spray-dried and freeze-dried instant coffees.

[34. The process of claim 24 wherein said coffee product is roast and ground coffee.]

35. The process of claim 24 wherein said coffee product is a mixture of spray-dried agglomerated and freeze-dried instant coffees.

36. The process of claim 24 wherein the drops of aroma-enriched coffee oil added to said product are discrete droplets having a diameter of from about 0.5 millimeters to 5.0 millimeters.

37. The process of claim 24 wherein the droplet diameter is from 1.0 millimeters to 3.0 millimeters.

38. The process of claim 24 wherein the coffee product is an agglomerated flaked instant coffee.

[39. A coffee product selected from the group consisting of roast and ground coffee and instant coffee, having a pore factor of at least 0.9, in combination with aroma-enriched coffee oil to increase its roast and ground coffee aroma, wherein said product has an initial aroma intensity of at least 70,000 gas chromatograph counts when said product is an instant coffee, and wherein said product has an initial aroma intensity of at least 165,000 gas chromatograph counts when said product is a roast and ground coffee product.]

[40. The coffee product of claim 39 wherein said product is an instant coffee product and has a gas chromatograph measured aroma of from 70,000 counts to 650,000 counts.]

[41. The coffee product of claim 39 wherein said product is a roast and ground coffee product and wherein the gas chromatograph measured aroma is from 210,000 counts to 1,000,000 counts.]

* * * * *